March 16, 1965 W. J. ISENBERGER 3,173,703
SKI SLED
Filed July 15, 1963
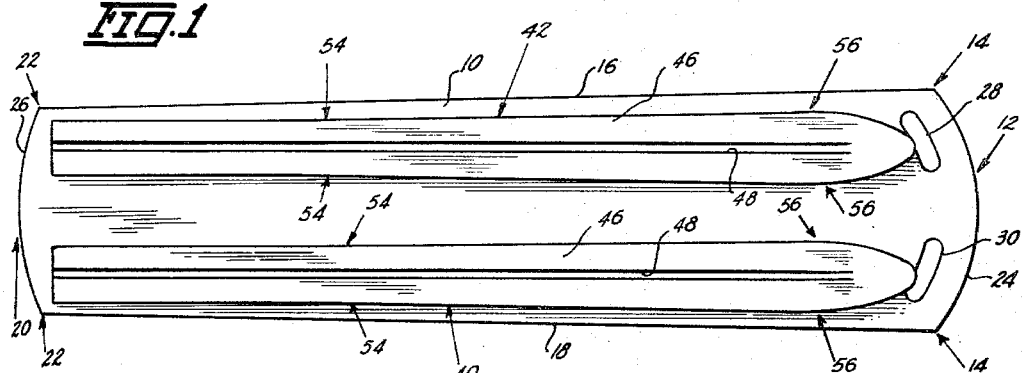
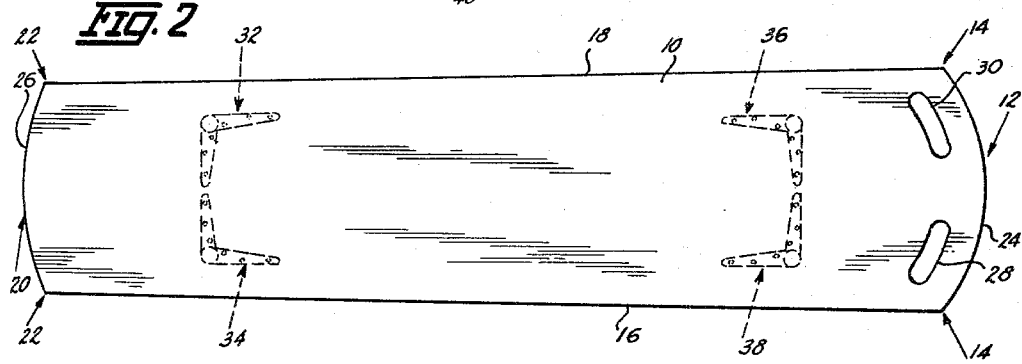
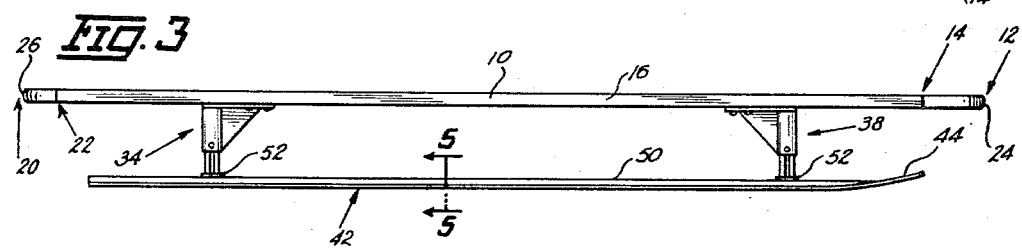
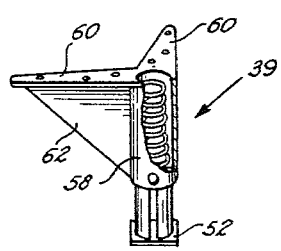
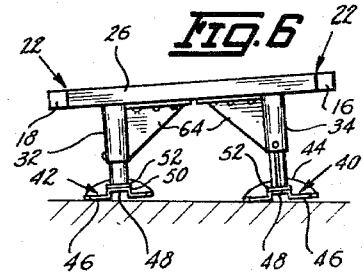
INVENTOR.
WILLIAM JACK ISENBERGER
BY Morton S. Adler
ATTORNEY 3,173,703
SKI SLED
William Jack Isenberger, Truro, Iowa
Filed July 15, 1963, Ser. No. 295,158
6 Claims. (Cl. 280—21)

This invention relates to improvements in a ski mounted sled.

One of the important objects contemplated herein is the provision of a novel ski sled designed to increase the enjoyment and thrills in the sport of sledding and to provide a sled construction capable of use in deeper snow where sleds with conventional runners are not satisfactory.

One of the novel features of this new sled resides in the elimination of the conventional steering mechanism structure and the providing of a steering control means which is effective merely by the operator shifting his weight toward the side in which a turn is to be made.

A further object is to provide a ski sled of the above class in which the sled is mounted to a pair of skis by resilient members whereby the shifting of the weight load on curves or side hills, for example, causes one side of the sled to be depressed and a corresponding elevation of the opposite side so that sled runs in a very stable manner.

To attain these objects and such further objects as may appear herein, or be hereinafter pointed out, reference is made to the accompanying drawings forming a part hereof, in which:

FIG. 1 is a bottom plan view of this new sled,

FIG. 2 is a top plan view thereof with the location of the supporting cylinders shown in broken lines, FIG. 3 is a side elevational view of this invention, FIG. 4 is an enlarged perspective view of one of the like cylinders used for attaching the sled to the skis.

FIG. 5 is a cross-sectional view taken on the line 5—5 of FIG. 3, and

FIG. 6 is a rear elevational view of this sled showing its position when the operator's weight has been shifted to the left side.

Referring to the drawings, an elongated flat seat or platform is designated by the numeral 10 and may be made from any suitable material such as wood, fiberglass, plastic or metal. While the size and shape of seat 10 may be varied as desired, I have preferably used approximately a six-foot center line length with the width at the forward end portion 12 between points 14, of eighteen inches and with the respective sides 16 and 18 tapered slightly toward the rearward end 20 to a width of approximately sixteen to sixteen and a half inches between points 22. The front and rear edges, 24 and 26 respectively, of platform 10 define a radius as shown. At each side of the forward end portion of platform 10, I have provided the respective elongated handgrip slots 28 and 30.

Depending from the seat or platform 10 are a plurality of individual like resilient supports designated generally by the numerals 32 and 34 at the rearward end and 36 and 38 at the forward end. These supports are preferably in the form of spring-loaded cylinders shown at 39 in FIG. 4, operating in a manner similar to a shock absorber. Supports 32 and 36 are in longitudinal alignment off-set to one side from the center line of seat 10 and are secured to a ski 40. Supports 34 and 38 are similarly arranged to the opposite side of the center line and are secured to a ski 42 that is similar in design to ski 40.

Skis 40 and 42 are preferably made of metal, are pointed or curved at the front as at 44 and have the flat running surface 46 (FIG. 5) in which is formed the longitudinal central groove 48 extending from the rear of the ski to the beginning of the curved end 44 as seen in FIG. 1. Groove 48, in effect, is defined by the channel structure 50 which is elevated relative to the plane of surface 46 and serves as the support to which the base plate 52 of the support cylinders 39 (FIG. 4) is secured.

The general shape of skis 40 and 42 is important from the standpoint of directional control of this sled as will later be referred to in more detail and in this respect, the width of each ski progressively increases in a slight radius from point 54 forwardly to points 56, with points 54 being generally within the central area of the rearward half of the ski length. While ski dimensions may be varied, I have used a three and one-half inch width at the rear end of the skis and a five inch width between points 56. Also, I can point out that groove 48 has been given a one inch width and a three-eighths inch depth but such figures are given for illustration only and are not intended to be limiting in any way.

The outer housing 58 of cylinder 39 (FIG. 4) includes the securing plates 60 at the top at right angles to each other and the gusset members 62 and 64 which provide a rigid assembly for attachment to seat 10 as shown in FIGS. 2 and 6.

In the use of this ski sled as described, the steering is accomplished by shifting one's weight to the side in the direction of the desired turn. Such a shifting of weight will cause a compression of the cylinders 39 on the side of shift and a corresponding expansion or extension of the cylinders on the opposite side as illustrated in FIG. 6 where it will be noted that the longitudinal side edge of each ski 40 and 42 in the direction of the turn will bite into the snow and the opposite ski edges may be slightly elevated although surfaces 46 of each ski will remain on parallel planes so as to uniformly contribute to the turning maneuver. Consequently, the greater drag on the ski on one side is most effective for the directional control desired. Such control is also implemented by the slight radius between ski points 54 and 56 and the overall stability of the skis relative to ground contact is augmented by the longitudinal groove 48 which increases the area of bearing surface against the snow.

It is normally intended that this ski sled will be used by a person in a prone position so that he can grasp the platform 10 at the slot points 28 and 30. However, it will be understood that this sled can also be used by one in a sitting position and for this purpose the sides of the seat or platform 10 can be grasped at any convenient place and slots 28 and 30 may be of a suitable size to permit the engagement thereof by the heel of a shoe or boot. In either position, the steering is accomplished by a shifting of the weight as described above.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:
1. A ski sled comprising:
an elongated flat platform having a rear and forward end and being progressively wider from said rear end to said forward end,
gripping means on the forward end portion of said platform,
a pair of skis having turned up forward ends,
compressible support means depending from each side of said platform,
each ski secured to the lower end of one of said support means, and said ski sled being steerable solely by an operator on said platform shifting his weight toward the side of the intended turn so as to compress said support means on said side only and cause the corresponding longitudinal edges of said skis to bite into the snow.

2. A ski sled comprising:
an elongated flat platform having a rear and forward end and being progressively wider from said rear end to said forward end,
gripping means on the forward end portion of said platform,
a pair of skis having turned up forward ends,
compressible support means depending from each side of said platform,
each ski secured to the lower end of one of said support means, and
said ski sled being steerable solely by an operator on said platform shifting his weight toward the side of the intended turn so as to compress said support means on said side only and cause a lateral tilting of said skis whereby corresponding longitudinal side edges of said skis in the direction of turn bite deeper into the snow than the respective opposite longitudinal side edges thereof.

3. A ski sled comprising:
an elongated flat platform having a rear and forward end and being progressively wider from said rear end to said forward end,
gripping means on the forward end portion of said platform,
a pair of skis having turned up forward ends,
compressible support means depending from each side of said platform,
each of said skis secured to the respective lower ends of said support means at one respective side of said platform, and
said ski sled being steerable solely by an operator on said platform shifting his weight toward the side of the intended turn so as to compress said support means on said side only and cause the corresponding longitudinal edges of said skis to bite into the snow.

4. A sled as defined in claim 3 wherein each ski is provided on its ground engaging side with a longitudinal centrally aligned groove.

5. A ski sled comprising:
an elongated flat platform having a rear and forward end and being progressively wider from said rear end to said forward end,
gripping means on the forward end portion of said platform,
a pair of skis having turned up forward ends,
said skis being of a like width from their respective rear end to a selected point toward their forward end and then defining a slight radius so as to be progressively wider in a like manner to said respective forward ends,
a pair of longitudinally aligned spring loaded cylinders depending from each side of said platform,
each ski being solely supported by and secured to the lower end of one pair of aligned cylinders, and
said ski sled being steerable solely by an operator on said platform shifting his weight toward the side of the intended turn so as to compress said spring loaded cylinders on said side only and cause the corresponding longitudinal edges of said skis to bite into the snow.

6. A ski sled comprising:
an elongated flat platform,
a pair of ski members,
a plurality of compressible support members depending from said platform,
part of said support members being off-set to one side of the longitudinal center line of said platform and in longitudinal alignment with each other,
the rest of said support members being similarly deposed at the opposite side of said center line,
each ski member secured to the lower end of one respective set of support members so that they are in parallel spaced relationship, and
said ski sled being steerable solely by an operator on said platform shifting his weight toward the side of the intended turn so as to compress said support members on said side only and cause a lateral tilting of said skis whereby corresponding longitudinal side edges of said skis in the direction of turn bite deeper into the snow than the respective opposite longitudinal side edges thereof.

References Cited by the Examiner
UNITED STATES PATENTS 2,357,928  9/44  Bowen et al. _____ 280—22

FOREIGN PATENTS 223,237  6/10  Germany.
453,644  12/49  Italy.

ARTHUR L. LA POINT, *Primary Examiner.*